United States Patent [19]

Hafele et al.

[11] 4,089,442

[45] May 16, 1978

[54] ACCUMULATIVE PRESSURE PUMP

[75] Inventors: Robert X. Hafele; Lewis C. LoMaglio, both of Baton Rouge, La.

[73] Assignee: Ethyl Corporation, Richmond, Va.

[21] Appl. No.: 728,212

[22] Filed: Sep. 30, 1976

[51] Int. Cl.[2] .......... G01F 11/06

[52] U.S. Cl. .......... 222/321; 222/385

[58] Field of Search .......... 222/385, 321, 378; 239/333, 331

[56] References Cited

U.S. PATENT DOCUMENTS

| | | | |
|---|---|---|---|
| Re. 28,366 | 3/1975 | Pechstein | 239/333 |
| 3,761,022 | 9/1973 | Kondo | 222/385 |

*Primary Examiner*—Allen N. Knowles

*Attorney, Agent, or Firm*—Donald L. Johnson; John F. Sieberth; David L. Ray

[57] ABSTRACT

A finger-operated spray pump assembly including a compression chamber, a primary piston and a secondary piston slidably fitted inside the compression chamber, a spring fitted inside the secondary piston for urging the secondary piston toward the primary piston, and a valve slidably connected to the secondary piston.

22 Claims, 3 Drawing Figures

ACCUMULATIVE PRESSURE PUMP

BACKGROUND OF THE INVENTION

The present invention relates to liquid atomizer pumps. In particular, the invention relates to small hand-held, finger-operated dispensers involving pump assemblages as distinguished from pressurized aerosol containers and valves.

Pumps of the type with which the present invention is concerned include a piston arranged to be driven into the pump housing against a spring pressure so as to deliver the liquid to the nozzle. It is known that, in order to obtain the highest possible degree of atomization, it is preferable to provide at the pump outlet a so-called turbulence nozzle.

However, it has been found that even the use of a nozzle of this type in prior art atomizing pumps does not completely preclude the occurrence of an insufficient atomization and the formation of droplets in the vicinity of the nozzle, particularly when the pump is subjected to a relatively slow depression movement. Furthermore, the liquid remaining in the nozzle after the atomization operation tends to dry up and to obstruct the nozzle.

U.S. Pat. No. Re. 28,366, reissued Mar. 18, 1975 to Pechstein discloses an atomizing pump which has as its object the elimination of some of these drawbacks. The Pechstein patent discloses a pump that has a first piston and a second piston, the first piston having a liquid flow passage. A valve which moves relative to the first piston and the second piston is disposed for closing the liquid flow passage in the first piston.

SUMMARY OF THE INVENTION

In accordance with the present invention, there is provided a finger-operated pump assembly including a compression chamber, a primary piston and a secondary piston slidably fitted inside the compression chamber, a spring fitted inside the secondary piston for urging the secondary piston toward the primary piston, and a valve slidably connected to the secondary piston.

DESCRIPTION OF THE PREFERRED EMBODIMENTS

Figure 1:
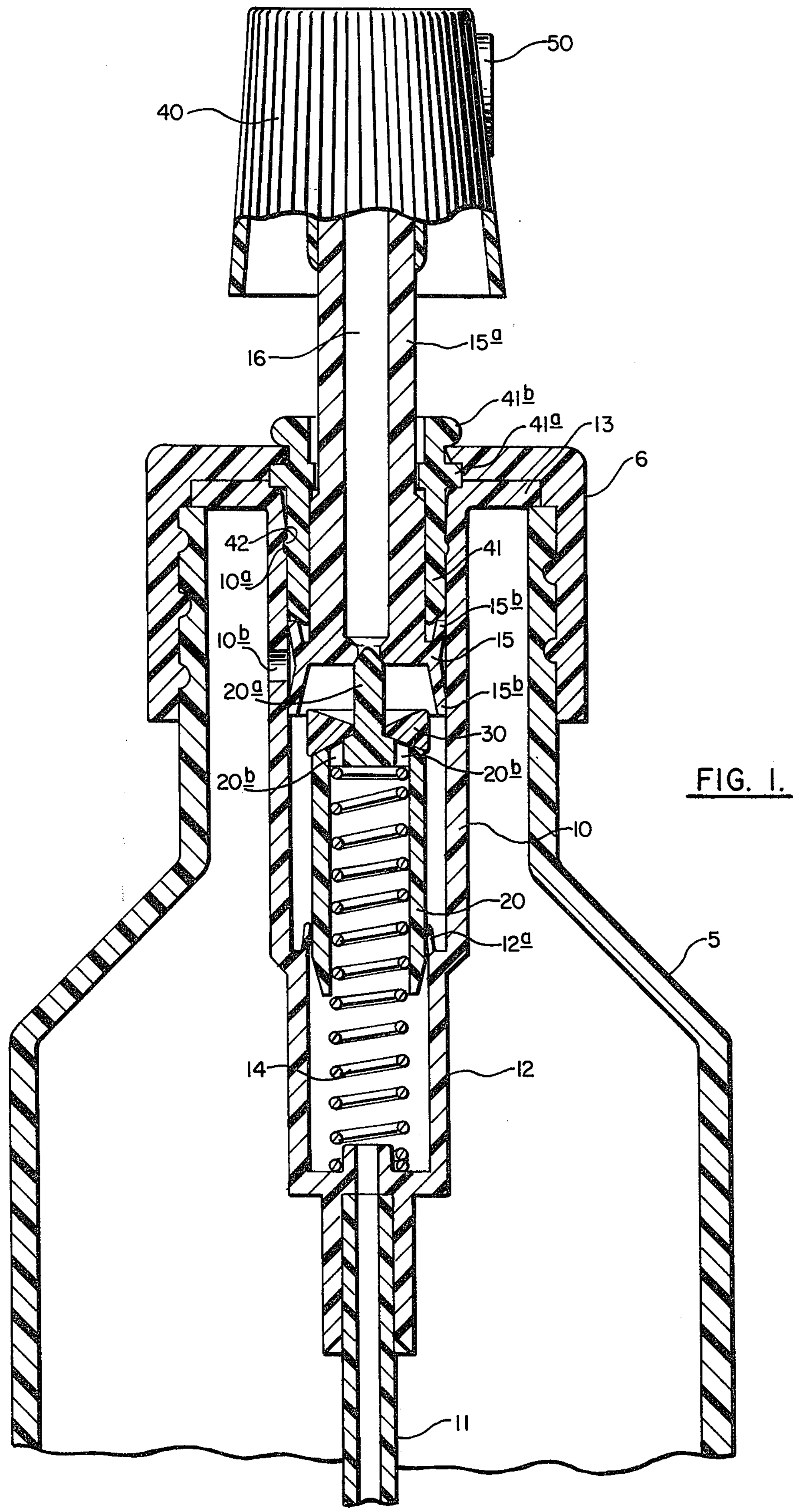
FIG. 1 is an enlarged fragmentary sectional view showing details of the pump.

The atomizer of the present invention includes a cylindrical compression chamber 10 housing a primary piston 15. Connected to compression chamber 10 is cylinder 12 housing a secondary piston 20. Cylinder 12 is preferably integrally formed with compression chamber 10 and has a smaller diameter and cross-sectional area than cylindrical compression chamber 10. At the top of cylinder 12 is a collar **12*a* which makes a sliding seal with piston 20. Cylinder 12 and its associated piston 20 are arranged upstream, with respect to the direction of the liquid flow, of compression chamber 10 and its associated piston 15. At the lower, or upstream, end of cylinder 12 is connected a suction tube 11. The suction tube 11 is arranged to extend substantially to the bottom of container 5** to which the atomizer pump may be connected.

Primary piston 15 is slidably contained within compression chamber 10 by means of an insert 41 which restricts the upward movement of piston 15. Insert 41 may be connected to the inside of compression chamber 10 by means of a lower annular bead 42 which snaps into a groove **10*a* located on the inside surface of compression chamber 10. An outer shoulder 41*a* of insert 41 contacts the top of flange 13. Flange 13 is preferably integrally formed with compression chamber 10 and cylinder 12. Closure 6 is held between outer shoulder 41*a* and annular bead 41*b* of insert 41**.

Closure 6 can be seen in the drawings to be a threaded cap which is screwed onto the threaded top of container 5. However, any conventional closure, such as a snap-on cap, may be used.

Primary piston 15 is formed with an axial fluid passage 16 which passes through the piston and through a stem **15*a* integral with the piston. The passage 16 is associated with valve 20*a* which tends to close passage 16 when piston 15 is at rest, or moved in the fluid conveying direction, i.e., downwardly. Valve 20*a* is integrally formed with secondary piston 20**.

Secondary piston 20 is provided with axial passageway **20*b*. The upper end defines a seating for a movable valve 30. Movable valve 30 tends to close the passage 20*b* when piston 15 is driven in the fluid conveying direction, i.e., downwardly. The movable valve 30 thus acts as a further valve means, serving the necessary function of preventing backflow of fluid from the space between the inside wall of compression chamber 10 and the outside walls of secondary piston 20 into the interior of secondary piston 20**.

Stem **15*a* carries an actuator button 40 formed with a conventional radially extending passage (not shown) in permanent communication with passage 16. The outer end of the radially extending passage and actuator button 40 is equipped with a nozzle insert 50, which is preferably in the form of a turbulence nozzle whose opening is in permanent communication with passage 16**.

The upper end of the space defined by compression chamber 10 is closed by insert 41. Each end of piston 15 is provided with an annular scaling collar **15*b* which is preferably formed integrally with the piston and which forms a seal with the inner wall of compression chamber 10. A vent hole 10*b* is located in the upper wall of compression chamber 10 to allow air to displace fluid removed from the container when piston 15 is depressed. The entire piston assembly is supported by a helical compression spring 14 disposed within cylinder 12 and within secondary piston 20 which bears against the upper inside surface of the top piston 20**.

Figure 2:
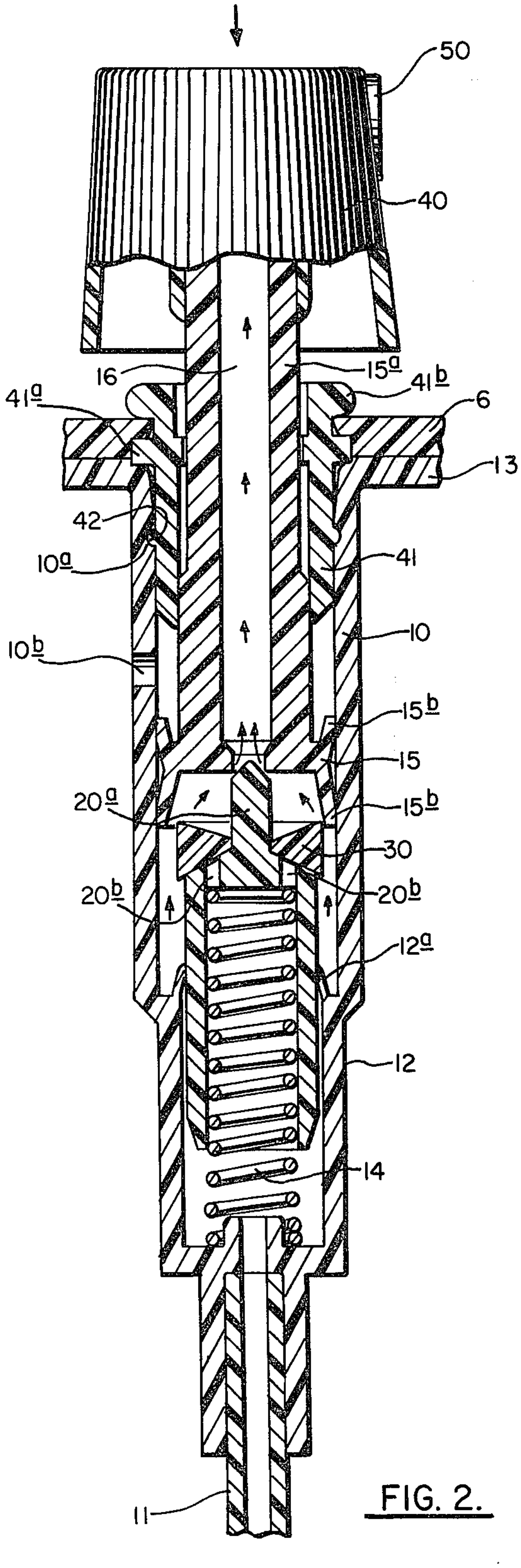
FIG. 2 is an enlarged fragmentary sectional view of the pump with the piston being depressed.

In operation, the actuator button 40 is first depressed moving the assembly of pistons 15 and 20 and valves **20*a* and 30 downwardly compressing spring 14. The fluid trapped in compression chamber 10 transmits a pressure which maintains valve 30 in a closed condition. As piston 15 continues moving downwardly, fluid pressure increases within the inside surface of compression chamber 10 and the outside surface of piston 20 and valve 30. At some point, the pressure reaches a level at which the downward force on the top of valve 30 is greater than the force inserted upwardly by spring 14. Such a condition is illustrated in FIG. 2. At that point, piston 20 and its integrally formed valve 20*a* move downward with valve 30 relative to piston 15** and fluid leaves compression chamber 10. As indicated by the arrows in FIG. 2, fluid from compression chamber 10 passes upwards through passage 16 and actuator button 40 to be atomized by nozzle insert 50.

With the passage thus opened, the pressure imposed on the fluid in the compression chamber 10 by the continued downward movement of piston 15 causes the fluid to be driven through passage 16 and to be atomized by nozzle 40. The flow of fluid continues through passage 16 until piston 20 has been driven upwardly by spring 14 to a sufficient height to cause valve 20*a* to return to its closed position by striking piston 15 due to a sufficient reduction within compression chamber 10.

Figure 3:
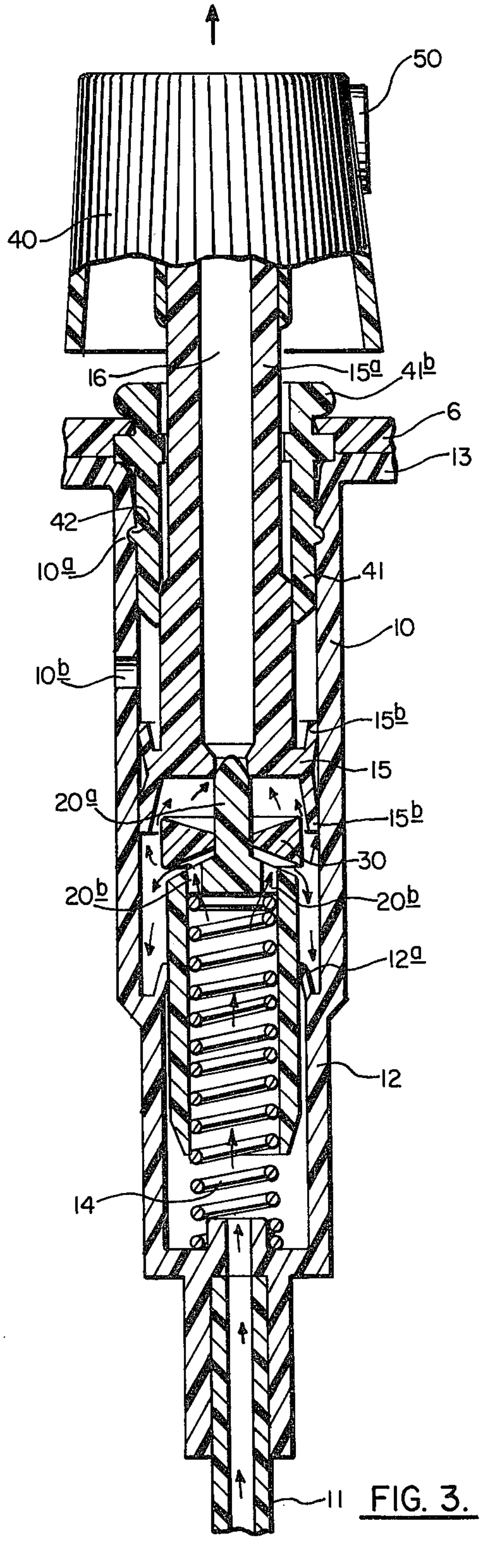
FIG. 3 is an enlarged fragmentary sectional view of the pump as the piston is rising.

As can be seen in FIG. 3, as piston 15 moves upward under the influence of spring 14, a pressure drop occurs in compression chamber 10. Fluids are drawn by the pressure drop from container 5 through dipper tube 11 into cylinder 12, upward into the interior of piston 20, upward through passage 20*b*, past valve 30 and into the space between secondary piston 20 and compression chamber 10.

It can thus be seen that the pump assembly includes first means defining a first variable volume space and a fluid flow passage in communication with the first space, and second means defining a second variable volume space in communication with the first space. The pump further includes a first valve 20*a* associated with primary piston 15 and disposed for isolating the flow passage from the first space, first valve 20*a* being rigidly connected to the secondary piston 20, and biasing means associated with secondary piston 20, for urging it into a condition corresponding to the maximum volume of the second space.

The first means are constituted by compression chamber 10 and piston 15 disposed for movement in a longitudinal direction in compression chamber 10 for varying the volume of the first space, and the second means are composed of a cylinder 12 which has a smaller cross-sectional area than compression chamber 10, and a piston 20 disposed for movement in cylinder 12 in the longitudinal direction for varying the volume of the second space. The liquid flow passage is formed, at least partially, in the piston 15. Furthermore, the biasing means, which are preferably constituted by helical compression spring 14, are connected to secondary piston 20.

It will be understood that the above description of the present invention is susceptible to various modifications, changes and adaptations and the same are intended to be comprehended within the meaning and range of equivalents of the appended claims.

What is claimed is:

1. A finger-operated pump assembly comprising:

a. compression chamber means;

b. cylinder means connected to said compression chamber means;

c. primary piston means slidably fitted inside said compression chamber means, said primary piston means having primary liquid flow passage means;

d. secondary piston means slidably fitted inside said compression chamber means and said cylinder means, said secondary piston means having secondary liquid flow passage means;

e. resilient means fitted inside said secondary piston means and inside said cylinder means to urge said secondary piston means towards said primary piston means;

f. first valve means rigidly connected to said secondary piston means for contacting said primary liquid flow passage means to stop the flow of liquid from said compression chamber means through said primary liquid flow passage means; and, g. secondary valve means for preventing back flow of liquid through said secondary liquid flow passage means.

2. The pump assembly of claim 1 wherein said cylinder means has an internal cross-sectional area in a plane perpendicular to the direction of movement of said primary piston means, and said cylinder means is smaller in cross-sectional area than said compression chamber means.

3. The pump assembly of claim 2 wherein said primary piston means and said secondary piston means are coaxially disposed for movement in the same direction.

4. The pump assembly of claim 2 wherein said compression chamber means and said cylinder means are disposed in line with each other.

5. The pump assembly of claim 2 wherein said cylinder means has annular collar means connected to the upper end thereof for making a sliding seal with the outer wall of said secondary piston means.

6. The pump assembly of claim 2 wherein said primary piston means has an annular scaling collar means for forming a seal with the inner wall of said compression chamber means.

7. The pump assembly of claim 2 wherein said compression chamber means has insert means connected to the upper end thereof for limiting the upward movement of said primary piston means.

8. The pump assembly of claim 2 wherein said compression chamber means has vent hole means in the wall thereof.

9. The pump assembly of claim 2 wherein said secondary piston means is generally hollow inside and said secondary flow passage means is located at the upper end thereof.

10. The pump assembly of claim 2 wherein said first valve means is located at the upper end of said secondary piston means and projects upwardly therefrom.

11. The pump assembly of claim 10 wherein said secondary valve means comprises a disc means for isolating said secondary flow passage means having a hole in the center thereof through which is slidingly fitted a portion of said first valve means.

12. A pump assembly for conveying liquids to be atomized, comprising, in combination:

a. a first means defining a first variable volume space and a fluid flow passage in communication with said first space;

b. second means defining a second variable volume space in communication with said first space;

c. first valve means associated with said first means and disposed for isolating said passage from said first space;

d. means rigidly connecting said second means to said first valve means for controlling the opening and closing of said first valve means;

e. biasing means associated with said second means for urging it into a condition corresponding to the maximum volume of said second space; and, f. secondary valve means for preventing back flow of fluid from said first variable volume space to said second variable volume space.

13. The pump assembly of claim 12 wherein: (i) said first means are constituted by compression chamber means and by primary piston means, said primary piston means defining said liquid flow passage and being disposed for movement in a longitudinal direction in said compression chamber means for varying the volume of said first space; (ii) said second means are constituted by cylinder means having an internal cross-sectional area in a plane perpendicular to the direction of movement of said primary piston means, which is smaller than that of said compression chamber means, and a secondary piston means disposed for movement in said cylinder means in said longitudinal direction for varying the volume of said second space; (iii) said first valve means are associated with said primary piston means for isolating said liquid flow passage from said first space at least during a portion of the travel of said primary piston in a direction which decreases the volume of said first space; and, (iiii) said means connecting said first valve means to said second means rigidly connects said first valve means to said secondary piston means.

14. The pump assembly of claim 13 wherein said primary and said secondary piston means are coaxially disposed for movement in the same direction.

15. The pump assembly of claim 13 wherein said compression chamber means and said cylinder means are disposed in line with each other.

16. The pump assembly of claim 13 wherein said cylinder means has annular collar means connected to the upper end thereof for making a sliding seal with the outer wall of said secondary piston means.

17. The pump assembly of claim 13 wherein said primary piston means has an annular scaling collar means for forming a seal with the inner wall of said compression chamber means.

18. The pump assembly of claim 13 wherein said compression chamber means has insert means connected to the upper end thereof for limiting the upward movement of said primary piston means.

19. The pump assembly of claim 13 wherein said compression chamber means has vent hole means in the wall thereof.

20. The pump assembly of claim 13 wherein said secondary piston means is generally hollow inside and said secondary flow passage is located at the upper end thereof.

21. The pump assembly of claim 13 wherein said first valve means is located at the upper end of said secondary piston means and projects upwardly therefrom.

22. The pump assembly of claim 21 wherein said secondary valve means comprises a disc means for isolating said secondary flow passage means having a hole in the center thereof through which is slidingly fitted a portion of said first valve means.

* * * * *